(12) United States Patent
Karagoez (10) Patent No.: US 11,313,397 B2
(45) Date of Patent: Apr. 26, 2022

(54) RELEASABLE INTERLOCKING CONNECTION BETWEEN A FIRST BODY AND A SECOND BODY

(71) Applicant: Knorr-Bremse Systeme Fuer Nutzfahrzeuge GmbH, Munich (DE)

(72) Inventor: Hasan-Oezkan Karagoez, Pforzheim (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 3 days.

(21) Appl. No.: 16/979,366

(22) PCT Filed: Feb. 20, 2019

(86) PCT No.: PCT/EP2019/054150
§ 371 (c)(1),
(2) Date: Sep. 9, 2020

(87) PCT Pub. No.: WO2019/174873
PCT Pub. Date: Sep. 19, 2019

(65) Prior Publication Data
US 2021/0003155 A1   Jan. 7, 2021

(30) Foreign Application Priority Data

Mar. 14, 2018  (DE) ................. 102018105942.6

(51) Int. Cl.
*F16B 5/06* (2006.01)
(52) U.S. Cl.
CPC .......... *F16B 5/0664* (2013.01); *F16B 5/0635* (2013.01); *F16B 5/0642* (2013.01)
(58) Field of Classification Search
CPC ..... F16B 5/0664; F16B 5/0635; F16B 5/0642
See application file for complete search history.

(56) References Cited

U.S. PATENT DOCUMENTS 3,861,112 A    1/1975  Caroselli
4,162,715 A *  7/1979  Coulombe ............ B60R 22/321
                                                    24/602
(Continued)

FOREIGN PATENT DOCUMENTS

CN    1223616 A    7/1999
CN    1225424 A    8/1999
(Continued)

OTHER PUBLICATIONS

International Search Report dated May 27, 2019 in connection with PCT/EP2019/054150.

*Primary Examiner* — David M Upchurch
(74) *Attorney, Agent, or Firm* — Norton Rose Fulbright US LLP; Gerard Messina (57) ABSTRACT

A releasable-positively-locking-connection (RPLC) between first/second bodies, including: a) a linear-guide between first/second bodies, so that the linear-guide is engage-able; b) a separate-securing-element, fastened releasably by one end in a first-opening in the first-body and/or in a third-opening in a third-body, so that the securing-element protrudes from the first-opening; and c) a second-body section, which is deformable elastically by the separate-securing-element in the longitudinal-axis-direction of the separate-securing-element and has a stop-face, with which the separate-securing-element is contactable; d) the elastically-deformable-section and separate-securing-element interact, e) to assemble the RPLC, e1) the linear guide is engaged between first/second bodies, and e2) first, the first-body is guided linearly in an assembly-direction along the linear-guide, the elastically-deformable-section being contacted by the separate-securing-element which protrudes out of the first-opening, and deformed elastically in the longitudinal-axis-direction of the separate-securing-element, e3) until, secondly, an assembly-end-position is (Continued)

reached, in which the separate-securing-element passes the stop-face and, the elastic-section springs back, and the separate-securing-element engages in a positively-locking manner behind the stop-face, and configures a stop, f) to dismantle the RPLC, f1) the separate-securing-element is released from the first/third-opening, and f2) the first-body is moved linearly along the linear-guide in a dismantling-direction, opposed to the assembly-direction, until the linear-guide doesn't engage between the first/second bodies.

12 Claims, 6 Drawing Sheets

(56) References Cited

U.S. PATENT DOCUMENTS

| | | | |
|---|---|---|---|
| 9,938,797 B2* | 4/2018 | MacDonald | E21B 17/04 |
| 2005/0172462 A1* | 8/2005 | Rudduck | F16B 21/06 |
| | | | 24/606 |
| 2007/0006431 A1* | 1/2007 | Bentsen | A44B 11/2503 |
| | | | 24/636 |
| 2011/0150560 A1* | 6/2011 | Rudduck | F16B 5/0642 |
| | | | 403/33 |

FOREIGN PATENT DOCUMENTS

| | | |
|---|---|---|
| CN | 107420388 A | 12/2017 |
| EP | 2460394 A1 | 6/2012 |
| EP | 2789907 A1 | 10/2014 |
| FR | 2222562 A1 | 10/1974 |
| WO | 2011004823 A1 | 1/2011 |
| WO | 2011013039 A1 | 2/2011 |

* cited by examiner

RELEASABLE INTERLOCKING CONNECTION BETWEEN A FIRST BODY AND A SECOND BODY

FIELD OF THE INVENTION

The present invention relates to a releasable positively locking connection between a first body and a second body. Furthermore, the invention also relates to an electric connecting device comprising at least one releasable positively locking connection of this type, and to a solenoid valve device comprising at least one electric connecting device of this type, and to an electropneumatic device of a vehicle comprising at least one solenoid valve device of this type.

BACKGROUND INFORMATION

Releasable positively locking connections of the generic type, for example between housing components, are based on a latching action of latching lugs on one housing component with corresponding latching faces on the other housing component.

SUMMARY OF THE INVENTION

The present invention is based on the object of developing a releasable positively locking connection in such a way that it can be assembled and dismantled by way of a simple arrangement. Furthermore, an electric connecting device comprising at least one releasable positively locking connection of this type, a solenoid valve device comprising at least one electric connecting device of this type, and an electropneumatic device of a vehicle comprising at least one solenoid valve device of this type are also to be provided.

The object may be achieved by the features of as described herein.

The invention provides a releasable positively locking connection between a first body and a second body, which connection comprises at least the following:
a) a linear guide between the first body and the second body, it being possible for the linear guide to be brought into and out of engagement,
b) at least one separate securing element which is fastened releasably by way of its one end in at least one first opening in the first body or in at least one third opening in a third body, in such a way that the at least one separate securing element protrudes with its other end out of the first opening, and
c) at least one section of the second body, which section can be deformed elastically by way of the other end of the separate securing element in the direction of the longitudinal axis of the at least one separate securing element and is provided with a stop face, with which, as viewed in the direction of the linear guide, the other end of the separate securing element can come into contact,
d) the at least one elastically deformable section and the at least one separate securing element interacting with one another in such a way that,
e) in order to assemble the releasable positively locking connection,
  e1) first of all the linear guide is brought into engagement between the first body and the second body, and then,
  e2) in a first assembly phase, the first body is guided in a linear manner in an assembly direction along the linear guide relative to the second body, the elastically deformable section being contacted by the other end of the separate securing element, and being deformed elastically in the direction of the longitudinal axis of the separate securing element, until,
  e3) in a second assembly phase, an assembly end position is reached, in which the other end of the separate securing element has passed the stop face and, as a result, the elastic section springs back, and the other end of the separate securing element engages in a positively locking manner behind the stop face as viewed in the direction of the linear guide and, as a result, configures a stop, and in such a way that,
f) in order to dismantle the releasable positively locking connection,
  f1) first of all the at least one separate securing element is released from the at least one first opening or from the at least one third opening, and then
  f2) the first body is moved in a linear manner along the linear guide with respect to the second body in a dismantling direction which is opposed to the assembly direction, until the linear guide passes out of engagement between the first body and the second body.

Due to the positively locking connection between the other end of the separate securing element, for example a head screw which is screwed into the opening, and the stop face, the connection can no longer be released of its own accord and remains secured for as long as the separate securing element is situated in the opening.

By way of the arrangement, simple assembly and dismantling of the releasable positively locking connection are possible.

Advantageous developments and improvements of the first aspect of the invention are possible by way of the measures which are described herein.

A counterstop may be provided between the first body and the second body, which counterstop, in the assembly end position, prevents a movement of the other end of the separate securing element away from the stop face. Therefore, the releasable positively locking connection is secured by way of the counterstop.

In accordance with one exemplary embodiment, the elastically deformable section is configured as an elastically deformable tongue or as an elastically deformable finger, at the free end of which the stop face is configured. The stop face runs, in particular, parallel to a longitudinal axis of the at least one separate securing element which may be formed by way of a headed screw, the screw head of the headed screw then interacting in a positively locking manner with the stop face.

Particularly simple production results if, in particular, the elastically deformable tongue or the elastically deformable finger is configured together with the second body as a single-piece plastic injection molded product.

For example, the tongue or the finger of the second body is provided with a contact face which is configured as a ramp as viewed in cross section, the other end of the separate securing element running along the rising ramp in the course of the first assembly phase and, as a result, the finger or the tongue being deformed elastically by the other end of the separate securing element in the direction of the longitudinal axis of the securing element.

As has already been indicated above, the at least one separate securing element may be configured as a headed screw with a screw head and a screw shank, the one end of the separate securing element being formed by way of the screw shank which, in the case of the assembly, is screwed to an internal thread of the opening, and the other end of the separate securing element being formed by way of the screw head.

The linear guide can comprise, between the first body and the second body, at least one guide groove and at least one guide body which engages into the guide groove, the at least one guide groove being configured on the second body and the at least one guide body being configured on the first body, or the at least one guide groove being configured on the first body and the at least one guide body being configured on the second body. Here, any type of groove guide is conceivable, for example also a dovetail guide.

The invention also relates to an electric connecting device comprising at least one above-described releasable positively locking connection, the electric connecting device comprising at least one releasable electric connection, in the case of which electric contacts on the first body and electric countercontacts on the second body are arranged in such a way that, in the course of the assembly of the releasable positively locking connection and at the latest in the case of the assembly end position being reached, the electric contacts pass into electrically conducting contact with the countercontacts. This then has the advantage that the releasable electric connection is also brought about at the same time as the assembly of the releasable positively locking connection, which yields a broad area of use of the electric connecting device.

The invention also relates to a solenoid valve device comprising at least one above-described electric connecting device, the solenoid valve device comprising a solenoid valve block with at least one solenoid valve received therein and an electronic control unit, the first body being formed by way of a hold-down plate which is fastened releasably to a solenoid valve block and holds the at least one solenoid valve down in a receiving opening of the solenoid valve block, the second body being formed by way of an electric contact plate, and the third body being formed by way of the solenoid valve block, the electric contacts being connected electrically to the at least one solenoid valve, and the electric countercontacts being connected electrically to signal lines, into which control signals for the at least one solenoid valve are input in a controlled manner by the electronic control unit.

In other words, the hold-down plate then has an advantageous dual function, by it firstly holding the at least one solenoid valve down in an opening of the solenoid valve block, and secondly configuring a part of the longitudinal guide and/or the electric connecting device.

The at least one separate securing element may protrude through the at least one first opening of the hold-down plate and is held releasably in the at least one third opening of the solenoid valve block.

If, in addition, the hold-down plate is then also held releasably by way of the at least one separate securing element, in particular the headed screw on the solenoid valve block, the at least one separate securing element or the at least one headed screw then also performs an advantageous dual function, by it firstly holding the hold-down plate releasably on the solenoid valve block, and secondly ensuring the positively locking action of the releasable positively locking connection.

The invention also comprises an electropneumatic device of a vehicle comprising at least one above-described solenoid valve device, for example an electropneumatic service brake device, an electropneumatic parking brake device or an electropneumatic air suspension device of a vehicle.

In the following text, one exemplary embodiment of the invention is shown in the drawing and is described in greater detail in the following description.

DETAILED DESCRIPTION

Figure 1:
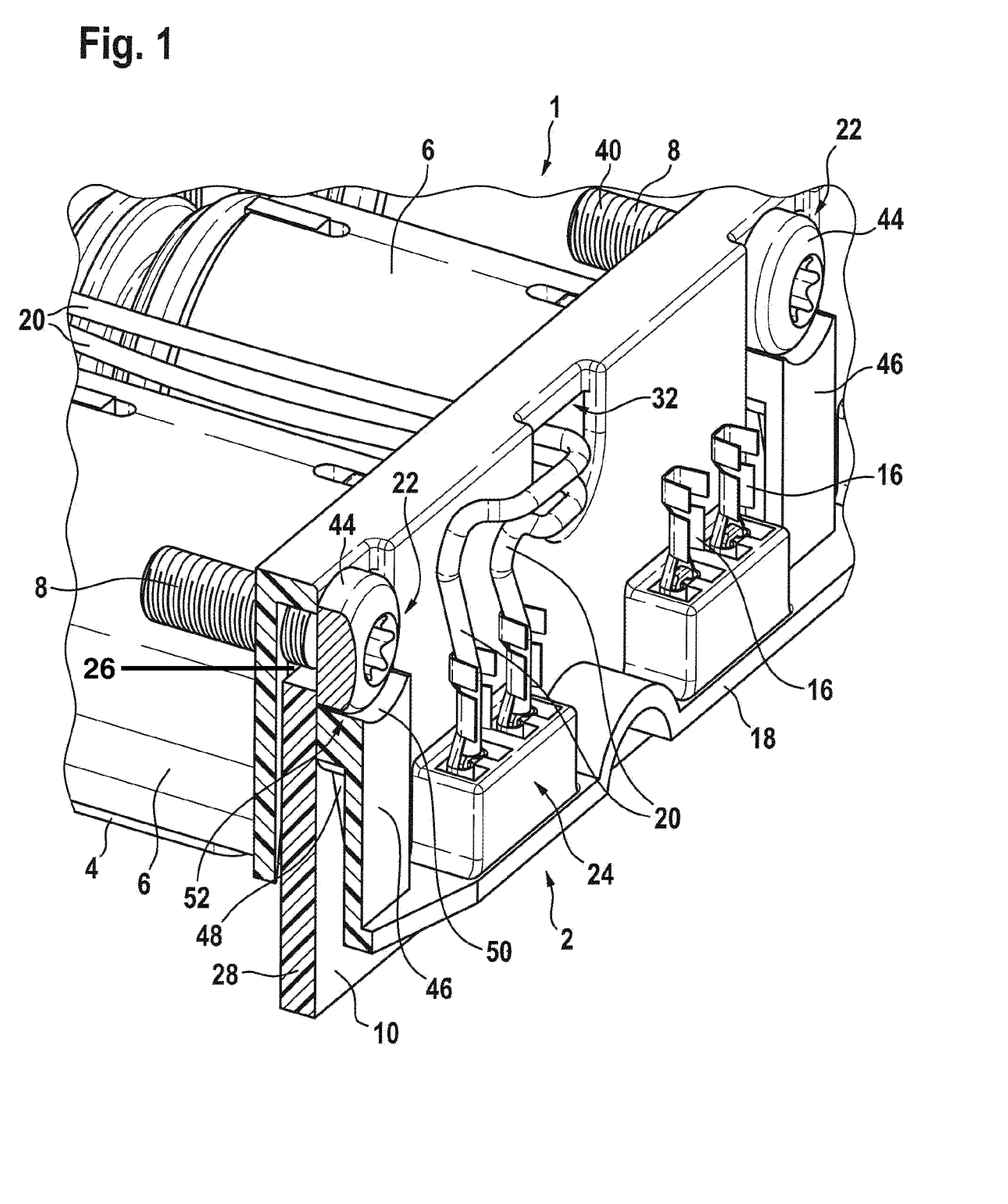
FIG. 1 shows a perspective view of a solenoid valve device of an electropneumatic service brake device of a vehicle in accordance with one exemplary embodiment of the invention.

FIG. 1 shows a perspective view of a solenoid valve device 1 of an electropneumatic service brake device of a vehicle in accordance with one embodiment of the invention.

The solenoid valve device 1 comprises an electric connecting device 2 and a solenoid valve block 4 with solenoid valves 6 which are received therein in receiving openings, and an electronic control unit (not shown here). Here, of the solenoid valve block 4, for reasons of clarity, merely the solenoid valves 6 which are received in receiving openings of the solenoid valve block 4 are shown.

A hold-down plate which may be fastened releasably to the solenoid valve block 4 by headed screws 8 holds the solenoid valves 6 down in the respective associated receiving openings of the solenoid valve block 4. As can be seen most clearly from FIG. 2 and FIG. 5, electric contacts 12 of the solenoid valves 6 protrude to the outside through openings 14 of the hold-down plate 10 and are contacted electrically there by countercontacts 16 which are arranged on a separate contact strip 18 which is, for example, likewise plate-shaped here. The electric contacts 12 of the solenoid valves 6 are, for example, offset on the end side, and in each case configure a male part. In contrast, the electric countercontacts 16 are configured, for example, as female sockets which lie in alignment with the electric contacts 12 and into which the electric contacts 12 can then be plugged, as a result of which a releasable electric connection 24 is produced. The male electric contacts can of course also be arranged on the contact strip and the female sockets as electric countercontacts can also be arranged on the solenoid valves 6.

Figure 2:
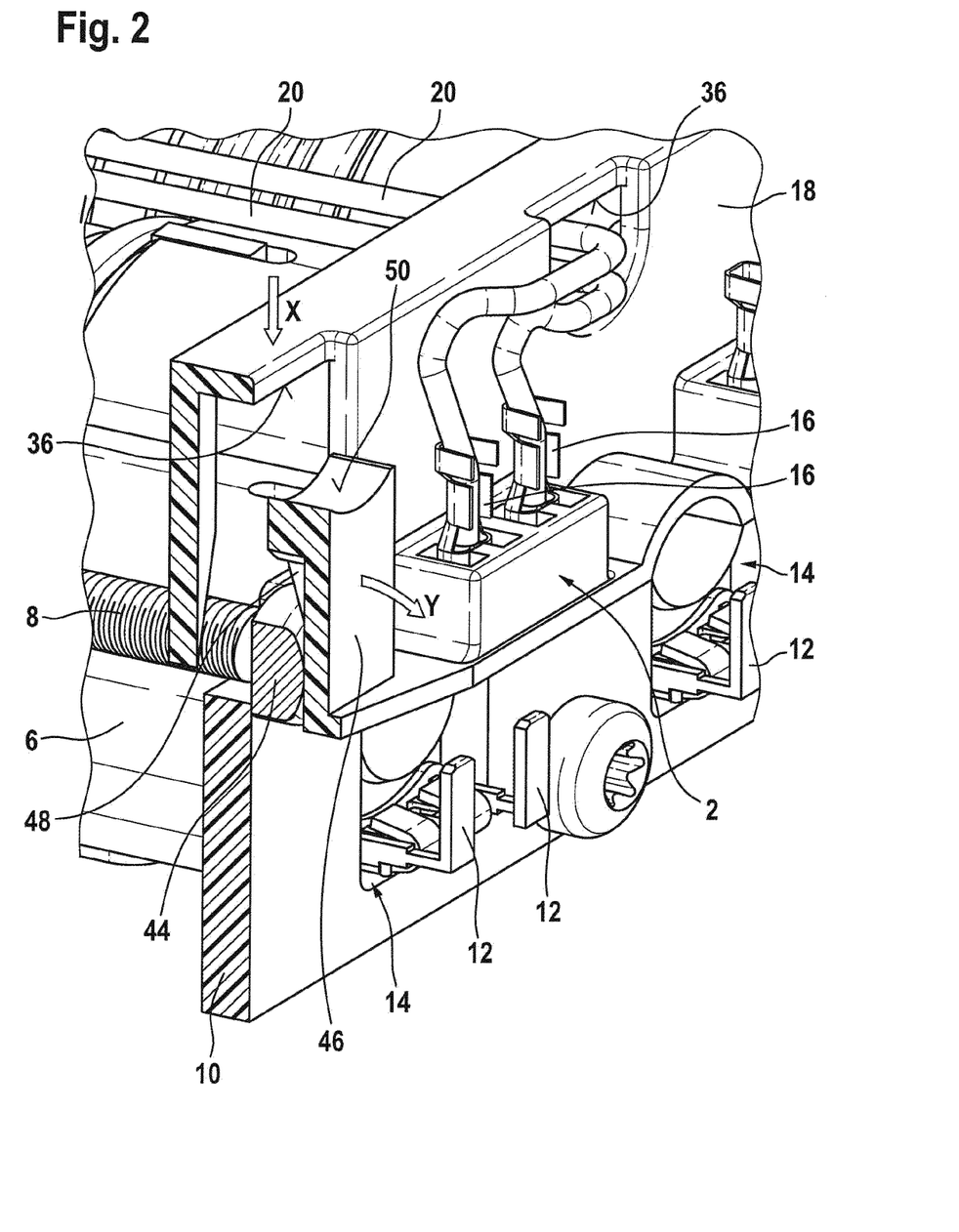
FIG. 2 shows a perspective view of an assembly of an electric connecting device of the solenoid valve device from FIG. 1.
Figure 2A:
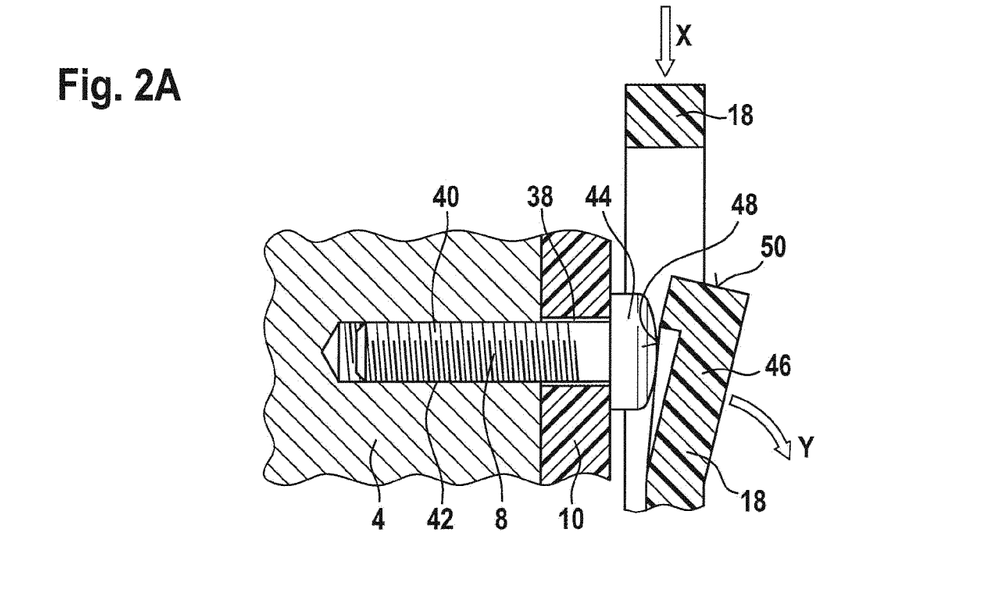
FIG. 2A shows a cross-sectional view of the assembly situation from FIG. 2 in a first assembly phase.
Figure 5:
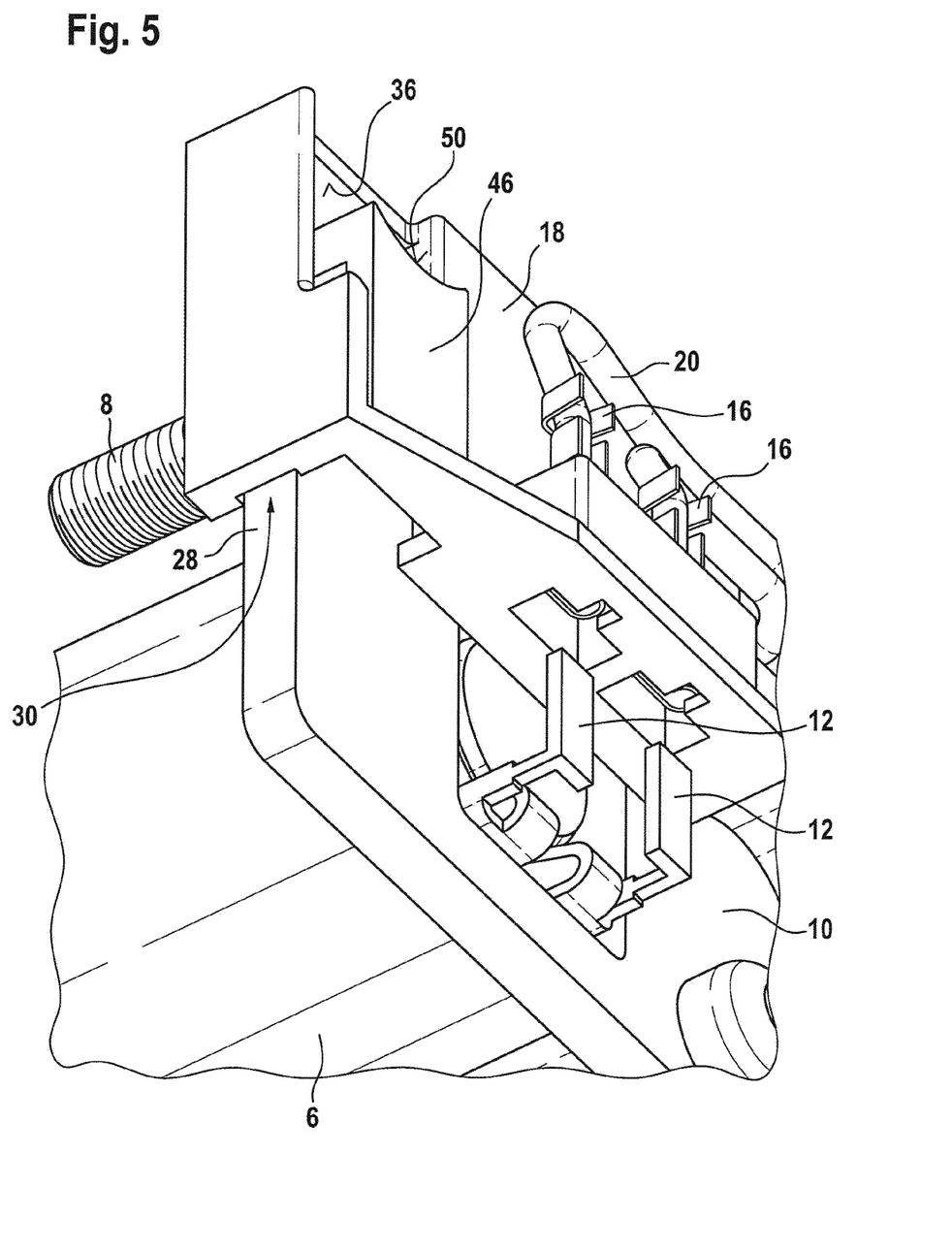
FIG. 5 shows a perspective view from below of the assembly situation from FIG. 2 in the first assembly phase.

The situation which is shown in FIG. 2 and FIG. 5 relates to a state, in which the electric connections between the electric contacts 12 and countercontacts 16 have not yet been produced, however. The electric contacts 12 and the electric countercontacts 16 are constituent parts of the electric connecting device 2.

The electric countercontacts 16 are connected electrically to signal lines 20, into which control signals for the solenoid valves 6 are input in a controlled manner by the electronic control unit. Therefore, the solenoid valves 6 are connected to the electronic control unit by way of the electric connecting device. In a manner which is dependent on the electric control signals, the solenoid valves 6 control pneumatic pressures within the electropneumatic service brake device.

Furthermore, the electric connecting device 2 comprises a releasable positively locking connection 22 between the hold-down plate 10 and the contact strip 18, the releasable electric connection 24 between the electric contacts 12 and the electric countercontacts 16 also being produced at the same time as the assembly of the positively locking connection 22, and the releasable electric connection 24 between the electric contacts 12 and the electric countercontacts 16 also being released at the same time during the dismantling of the positively locking connection 22.

Figure 4:
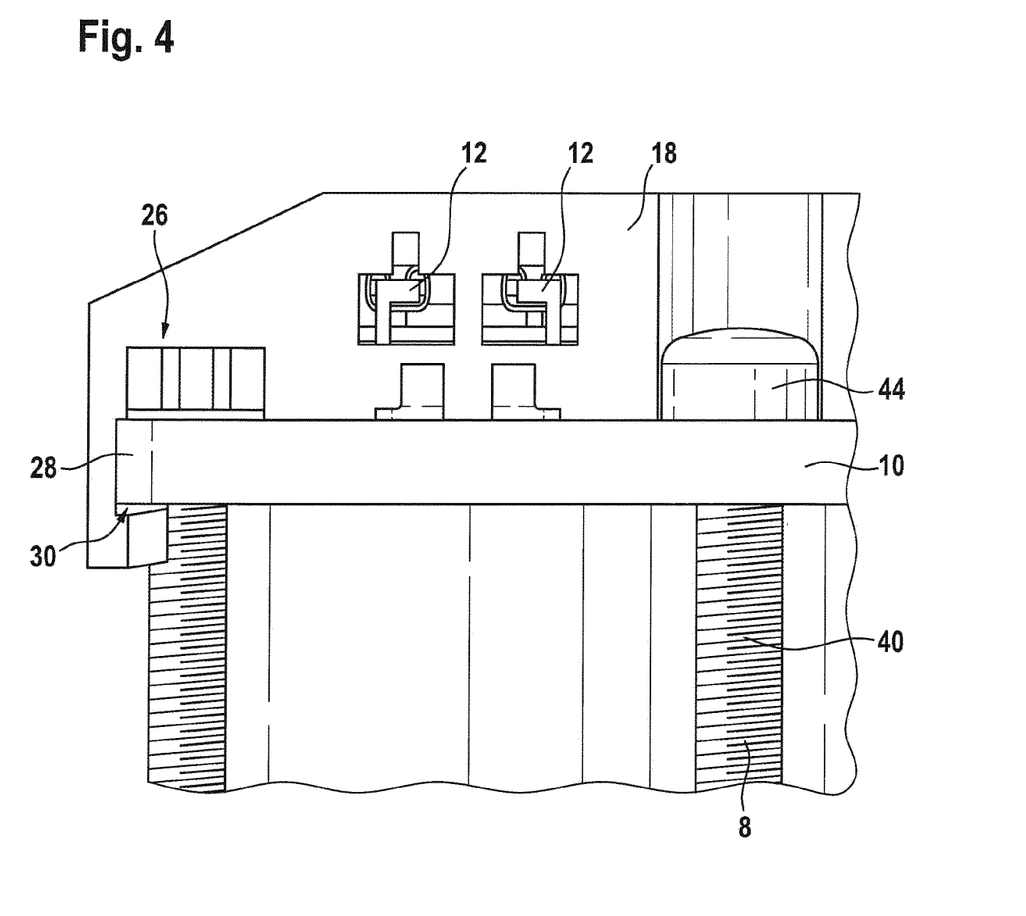
FIG. 4 shows a view from below of the electric connecting device of the solenoid valve device from FIG. 1.

The basis of the releasable positively locking connection 22 between the hold-down plate 10 and the contact strip 18 is formed by a linear guide 26 between the hold-down plate 10 and the contact strip 18; here, for example, in the form of a groove guide which can be seen most clearly on the basis of FIG. 4 and in the case of which in each case one edge 28 of the hold-down plate 10 is guided in in each case one groove 30 of the contact strip 18 in such a way that the contact strip 18 is guided with respect to the hold-down plate 10 parallel to the plate planes of the hold-down plate 10 and the plate-shaped contact strip 18. The contact strip 18 which is still loose can then be placed from above, in particular, in relation to the illustration of FIG. 1 onto the hold-down plate 10 with its two edges 28 being threaded into the associated grooves 30 of the contact strip 18, and can then be displaced downward along the linear guide 26 until a stop position is reached as counterstop 32, in which stop position an upper edge 34 of the hold-down plate 10 bears from below against an upper face 36 of the contact strip, as can be readily comprehended on the basis of FIG. 1 and FIG. 5. The electric contacts 12 and countercontacts 16 then move in a plane parallel to the linear guide 26.

In the hold-down plate 10, there are through openings as first openings 38, through which screw shanks 40 of the headed screws 8 are plugged, which screw shanks 40 are screwed releasably into threaded bores of the solenoid valve block 4 as third openings 42 and thus fix the hold-down plate 10 on the solenoid valve block 4 and therefore also fix the solenoid valves 6 in their receiving openings in the solenoid valve block 4. Here, the screw heads 44 protrude out of the first openings and from that side face of the hold-down plate 10 which is directed toward the contact strip 18. Here, the first openings 38 in the hold-down plate 10 are aligned with the third openings 42 in the solenoid valve block 4.

As can be seen most clearly on the basis of FIG. 2, fingers or tongues 46 which can be deformed elastically in the direction of the longitudinal axes of the headed screws 8 are configured in the wall of the contact strip 18, which fingers or tongues 46 are manufactured, for example, in one piece with the contact strip 18 as an injection molded product made from plastic. Here, in each case one end of a finger or a tongue 46 is connected to the wall of the contact strip, and the other end is a free end.

As FIG. 1, FIG. 2, FIG. 2A and FIG. 3 show, those faces of the fingers 46 which point toward the hold-down plate 10 are provided in each case with a ramp face 48 which rises as viewed in the assembly direction, with the result that, when the contact strip 18 is placed from above onto the hold-down plate 10 within the context of a first assembly phase and, as a result, the linear guide 26 is established (as the arrow X indicates), the screw heads 44 make contact with the ramp face 48 and, with an advancing movement of the contact strip 18 along the linear guide 26, the fingers 46 are then deformed elastically in the direction of the arrow Y by the screw heads 44 and, in particular, are bent away from the hold-down plate 10. As FIG. 5 shows, the electric contacts 12 of the solenoid valves 6 engage into the aligned electric countercontacts 16 on the contact strip 18, for example during the course of said first assembly phase, with the result that, as a result, the electric connections 24 between the electric contacts 12 and the electric countercontacts 16 are also produced. At their free ends, the elastically deformable fingers 46 have stop faces 50 for the screw heads 44 of the headed screws 8.

Figure 2B:
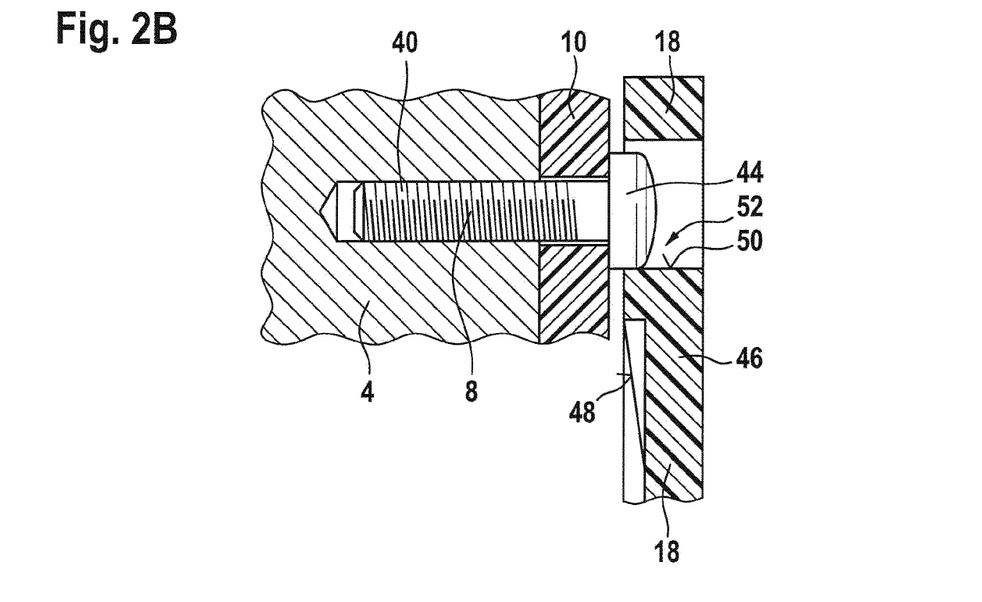
FIG. 2B shows a cross-sectional view of the assembly situation from FIG. 2 in a second assembly phase.

When the assembly end position of the contact strip 18 on the hold-down plate 10 is then reached within a second assembly phase, and the upper edge 34 of the hold-down plate 10 has come into contact from below against the upper face 36 of the contact strip 18, the screw heads 44 have passed the end-side stop faces 50 of the fingers, as a result of which the fingers 46 of the contact strip 18 snap back again into their straight starting position as a consequence of their elasticity, and then engage behind in each case the stop faces 50 of the fingers 46 as viewed in the direction of the linear guide 26, as FIG. 2B shows. A stop 52 for the contact strip 18 is formed by way of the stop faces 50, which stop 52 prevents the contact strip 18 from being pulled off upward from the hold-down plate 10 along the linear guide 26.

The contact strip 18 is then held in a releasable positively locking manner on the hold-down plate 10 by way of then firstly the screw heads 44 which bear as a stop 52 against the stop faces 50 of the fingers 46 and secondly that upper edge 34 of the hold-down plate 10 which bears as a counterstop 32 from below against the upper face 36 of the contact strip 18.

Figure 3:
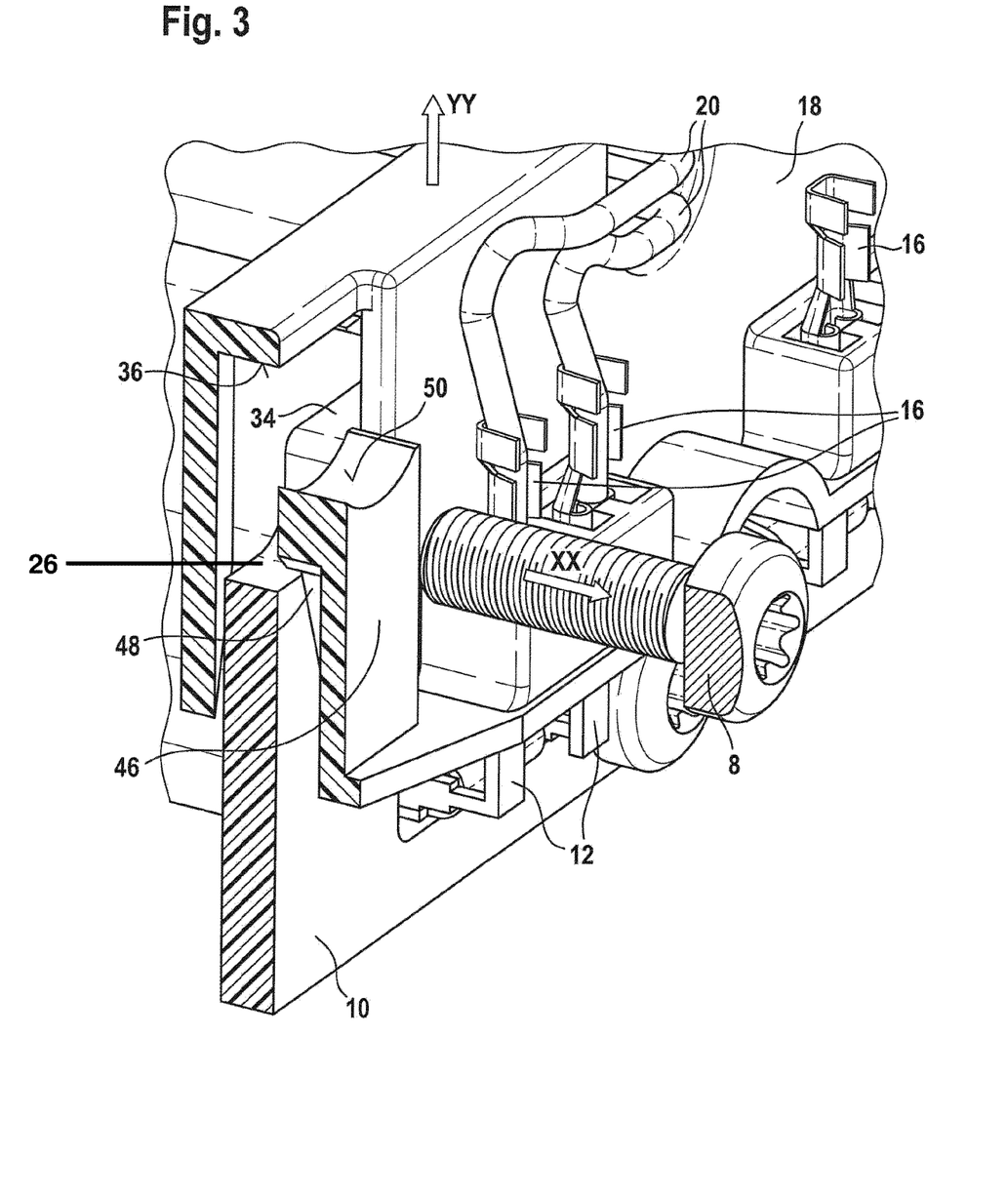
FIG. 3 shows a perspective view of a dismantling operation of the electric connecting device of the solenoid valve device from FIG. 1.

In order to dismantle the releasable positively locking connection 22 between the contact strip 18 and the hold-down plate 10, the headed screws 8 are released out of the first openings 38 and third openings 42, as indicated in FIG. 3 by way of the arrow XX. The stop faces 50 of the fingers 46 are then no longer locked or engaged behind by way of the screw heads, with the result that the contact strip 18 can then be pulled off upward from the hold-down plate 10 along the linear guide 26, as the arrow YY in FIG. 3 indicates. As can likewise be conceived on the basis of FIG. 3, the electric contacts 12 of the solenoid valves 6 then also pass out of engagement with the electric countercontacts 16 on the contact strip 18, with the result that the electric connections 24 are then also released automatically.

The List of Designations is as follows:

1 Solenoid valve device
2 Electric connecting device
4 Solenoid valve block
6 Solenoid valves
8 Headed screws
10 Hold-down plate
12 Electric contacts
14 Through openings
16 Electric countercontacts
18 Contact strip
20 Signal lines
22 Positively locking connection
24 Electric connections
26 Linear guide
28 Edge
30 Groove
32 Counterstop
34 Upper edge
36 Upper face
38 First openings
40 Screw shanks 42 Third openings
44 Screw heads
46 Finger
48 Ramp face
50 Stop face
52 Stop
X Arrow
Y Arrow
XX Arrow
YY Arrow

The invention claimed is:

1. A releasable positively locking connection between a first body and a second body, comprising:
 a) a linear guide between the first body and the second body, so that the linear guide is engage-able;
 b) at least one separate securing element having one end and another end which is fastened releasably by the one end in at least one first opening in the first body and/or in at least one third opening in a third body, so that the securing element protrudes with the another end out of the first opening; and
 c) at least one section of the second body, which can be deformed elastically by the other end of the separate securing element in the direction of the longitudinal axis of the separate securing element and is provided with a stop face, with which, as viewed in a direction of the linear guide, the other end of the separate securing element can come into contact;
 d) wherein at least one elastically deformable section and the at least one separate securing element are arranged and interacting with one another,
 e) wherein to assemble the releasable positively locking connection,
  e1) the linear guide is brought into engagement between the first body and the second body, and
  e2) in a first assembly phase, the first body is guided in a linear manner in an assembly direction along the linear guide relative to the second body, the elastically deformable section being contacted by that other end of the separate securing element which protrudes out of the first opening, and being deformed elastically in the direction of the longitudinal axis of the separate securing element,
  e3) wherein until, in a second assembly phase, an assembly end position is reached, in which the other end of the separate securing element has passed the stop face and, as a result, the elastic section springs back, and the other end of the separate securing element engages in a positively locking manner behind the stop face as viewed in the direction of the linear guide and, as a result, configures a stop, and
 f) wherein to dismantle the releasable positively locking connection,
  f1) the at least one separate securing element is released from the at least one first opening and/or from the at least one third opening, and
  f2) the first body is moved in a linear manner along the linear guide with respect to the second body in a dismantling direction which is opposed to the assembly direction, until the linear guide passes out of engagement between the first body and the second body.

2. The releasable positively locking connection of claim 1, further comprising:
 a counterstop between the first body and the second body, wherein the counterstop is produced in an assembly end position and prevents a movement of the other end of the separate securing element away from the stop face.

3. The releasable positively locking connection of claim 1, wherein the elastically deformable section is configured as an elastically deformable tongue or as an elastically deformable finger, at a free end of which the stop face is configured.

4. The releasable positively locking connection of claim 3, wherein the elastically deformable tongue or the elastically deformable finger is configured together with the second body as a single-piece plastic injection molded product.

5. The releasable positively locking connection of claim 3, wherein the tongue or the finger of the second body includes a contact face which is a ramp face as viewed in cross section, the other end of the separate securing element running along the rising ramp face in the course of the first assembly phase and, as a result, a finger or the tongue being deformed elastically by the other end of the separate securing element in the direction of the longitudinal axis of the separate securing element.

6. The releasable positively locking connection of claim 1, wherein the at least one separate securing element is configured as a headed screw with a screw head and a screw shank, the one end of the separate securing element being formed by way of the screw shank which, in the case of the assembly, is screwed to an internal thread of the first opening and/or the third opening, and the other end of the separate securing element being formed by way of the screw head.

7. The releasable positively locking connection of claim 1, wherein the linear guide has, between the first body and the second body, at least one guide groove and at least one guide body which engages into the guide groove, the at least one guide groove being configured on the second body and the at least one guide body being configured on the first body, or the at least one guide groove being configured on the first body and the at least one guide body being configured on the second body.

8. An electric connecting device, comprising:
 at least one releasable positively locking connection between a first body and a second body, including:
 a) a linear guide between the first body and the second body, so that the linear guide is engage-able;
 b) at least one separate securing element having one end and another end which is fastened releasably by the one end in at least one first opening in the first body and/or in at least one third opening in a third body, so that the securing element protrudes with the another other end out of the first opening; and
 c) at least one section of the second body, which can be deformed elastically by the other end of the separate securing element in the direction of the longitudinal axis of the separate securing element and is provided with a stop face, with which, as viewed in a direction of the linear guide, the other end of the separate securing element can come into contact;
 d) wherein at least one elastically deformable section and the at least one separate securing element are arranged and interacting with one another,
 e) wherein to assemble the releasable positively locking connection,
  e1) the linear guide is brought into engagement between the first body and the second body, and
  e2) in a first assembly phase, the first body is guided in a linear manner in an assembly direction along the linear guide relative to the second body, the elastically deformable section being contacted by that other end of the separate securing element which protrudes out of the first opening, and being deformed elastically in the direction of the longitudinal axis of the separate securing element, e3) wherein until, in a second assembly phase, an assembly end position is reached, in which the other end of the separate securing element has passed the stop face and, as a result, the elastic section springs back, and the other end of the separate securing element engages in a positively locking manner behind the stop face as viewed in the direction of the linear guide and, as a result, configures a stop, and f) wherein to dismantle the releasable positively locking connection,
  f1) the at least one separate securing element is released from the at least one first opening and/or from the at least one third opening, and
  f2) the first body is moved in a linear manner along the linear guide with respect to the second body in a dismantling direction which is opposed to the assembly direction, until the linear guide passes out of engagement between the first body and the second body;

wherein the electric connecting device includes at least one releasable electric connection, in the case of which electric contacts on the first body or on the third body and electric countercontacts on the second body are arranged in alignment with respect to one another so that, in the course of the assembly of the releasable positively locking connection and at the latest in the case of the assembly end position being reached, the electric contacts pass into electrically conducting contact with the countercontacts.

9. A solenoid valve device, comprising:
at least one electric connecting device, including at least one releasable positively locking connection between a first body and a second body, including:
a) a linear guide between the first body and the second body, so that the linear guide is engage-able;
b) at least one separate securing element having one end and another end which is fastened releasably by the one end in at least one first opening in the first body and/or in at least one third opening in a third body, so that the securing element protrudes with the another other end out of the first opening; and
c) at least one section of the second body, which can be deformed elastically by the other end of the separate securing element in the direction of the longitudinal axis of the separate securing element and is provided with a stop face, with which, as viewed in a direction of the linear guide, the other end of the separate securing element can come into contact;
d) wherein at least one elastically deformable section and the at least one separate securing element are arranged and interacting with one another,
e) wherein to assemble the releasable positively locking connection,
  e1) the linear guide is brought into engagement between the first body and the second body, and
  e2) in a first assembly phase, the first body is guided in a linear manner in an assembly direction along the linear guide relative to the second body, the elastically deformable section being contacted by that other end of the separate securing element which protrudes out of the first opening, and being deformed elastically in the direction of the longitudinal axis of the separate securing element,
  e3) wherein until, in a second assembly phase, an assembly end position is reached, in which the other end of the separate securing element has passed the stop face and, as a result, the elastic section springs back, and the other end of the separate securing element engages in a positively locking manner behind the stop face as viewed in the direction of the linear guide and, as a result, configures a stop, and
f) wherein to dismantle the releasable positively locking connection,
  f1) the at least one separate securing element is released from the at least one first opening and/or from the at least one third opening, and
  f2) the first body is moved in a linear manner along the linear guide with respect to the second body in a dismantling direction which is opposed to the assembly direction, until the linear guide passes out of engagement between the first body and the second body;
wherein the electric connecting device includes at least one releasable electric connection, in the case of which electric contacts on the first body or on the third body and electric countercontacts on the second body are arranged in alignment with respect to one another so that, in the course of the assembly of the releasable positively locking connection and at the latest in the case of the assembly end position being reached, the electric contacts pass into electrically conducting contact with the countercontacts;;
wherein the solenoid valve device includes a solenoid valve block with at least one solenoid valve received therein and an electronic control unit, the first body being formed by way of a hold-down plate which is fastened releasably to a solenoid valve block and holds the at least one solenoid valve down in a receiving opening of the solenoid valve block, the second body being formed by way of an electric contact plate, and the third body being formed by way of the solenoid valve block, the electric contacts being connected electrically to the at least one solenoid valve, and the electric countercontacts being connected electrically to signal lines, into which control signals for the at least one solenoid valve are input in a controlled manner by the electronic control unit.

10. The solenoid valve device of claim 9, wherein the hold-down plate is held releasably on the solenoid valve block by the at least one separate securing element.

11. The solenoid valve device as claimed in claim 10, wherein the at least one separate securing element protrudes through at least one first opening of the hold-down plate and is held releasably in at least one third opening of the solenoid valve block.

12. An electropneumatic device of a vehicle, comprising:
at least one solenoid valve device, including at least one electric connecting device, including at least one releasable positively locking connection between a first body and a second body, including:
a) a linear guide between the first body and the second body, so that the linear guide is engage-able;
b) at least one separate securing element having one end and another end which is fastened releasably by the one end in at least one first opening in the first body and/or in at least one third opening in a third body, so that the securing element protrudes with the another end out of the first opening; and
c) at least one section of the second body, which can be deformed elastically by the other end of the separate securing element in the direction of the longitudinal axis of the separate securing element and is provided with a stop face, with which, as viewed in a direction of the linear guide, the other end of the separate securing element can come into contact;

d) wherein at least one elastically deformable section and the at least one separate securing element are arranged and interacting with one another, e) wherein to assemble the releasable positively locking connection,
   e1) the linear guide is brought into engagement between the first body and the second body, and
   e2) in a first assembly phase, the first body is guided in a linear manner in an assembly direction along the linear guide relative to the second body, the elastically deformable section being contacted by that other end of the separate securing element which protrudes out of the first opening, and being deformed elastically in the direction of the longitudinal axis of the separate securing element,
   e3) wherein until, in a second assembly phase, an assembly end position is reached, in which the other end of the separate securing element has passed the stop face and, as a result, the elastic section springs back, and the other end of the separate securing element engages in a positively locking manner behind the stop face as viewed in the direction of the linear guide and, as a result, configures a stop, and f) wherein to dismantle the releasable positively locking connection,
   f1) the at least one separate securing element is released from the at least one first opening and/or from the at least one third opening, and
   f2) the first body is moved in a linear manner along the linear guide with respect to the second body in a dismantling direction which is opposed to the assembly direction, until the linear guide passes out of engagement between the first body and the second body;

wherein the electric connecting device includes at least one releasable electric connection, in the case of which electric contacts on the first body or on the third body and electric countercontacts on the second body are arranged in alignment with respect to one another so that, in the course of the assembly of the releasable positively locking connection and at the latest in the case of the assembly end position being reached, the electric contacts pass into electrically conducting contact with the countercontacts;;

wherein the solenoid valve device includes a solenoid valve block with at least one solenoid valve received therein and an electronic control unit, the first body being formed by way of a hold-down plate which is fastened releasably to a solenoid valve block and holds the at least one solenoid valve down in a receiving opening of the solenoid valve block, the second body being formed by way of an electric contact plate, and the third body being formed by way of the solenoid valve block, the electric contacts being connected electrically to the at least one solenoid valve, and the electric countercontacts being connected electrically to signal lines, into which control signals for the at least one solenoid valve are input in a controlled manner by the electronic control unit.

* * * * *